No. 706,071. Patented Aug. 5, 1902.
V. J. LA BAUVE.
SPOKE TIGHTENER.
(Application filed Nov. 23, 1901.)
(No Model.)
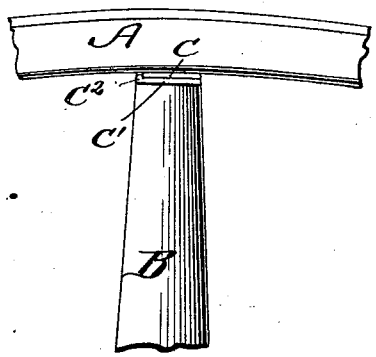
Fig. 1.
Fig. 2.
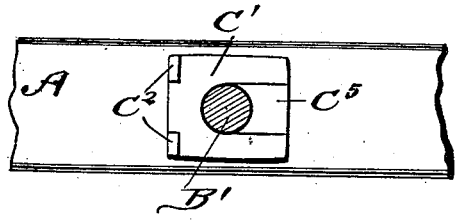
Fig. 5.
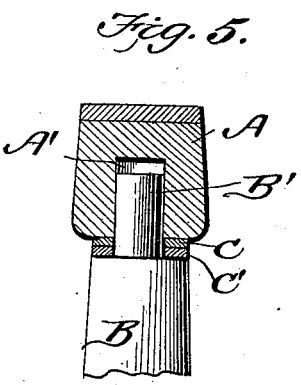
Fig. 3.
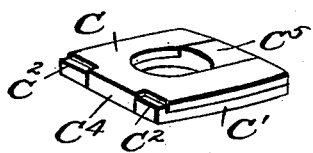
Fig. 4.
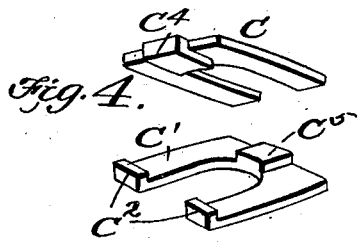
Witnesses
Inventor
V. J. La Bauve.
Attorneys

UNITED STATES PATENT OFFICE.

VALCOURE J. LA BAUVE, OF HOUSTON, TEXAS.

SPOKE-TIGHTENER.

SPECIFICATION forming part of Letters Patent No. 706,071, dated August 5, 1902.

Application filed November 23, 1901. Serial No. 83,416. (No model.)

*To all whom it may concern:*

Be it known that I, VALCOURE J. LA BAUVE, a citizen of the United States, residing at Houston, in the county of Harris and State of Texas, have invented a new and useful Spoke-Tightener, of which the following is a specification.

This invention is a spoke tightener and adjuster, the object being to provide a simple and efficient device by means of which any looseness occuring in the tire or between the tire and spokes can be quickly and easily taken up without removing the spoke from the tire.

With this object in view the invention consists of two interlocking washer-plates adapted to be arranged about the tenon of the spoke and between the end of said spoke and the inner face of the tire or felly.

The invention consists also in certain details of construction and novelties of combination hereinafter fully described, and pointed out in the claims.

In the drawings forming part of this specification, Figure 1 is a view showing the practical application of my invention. Fig. 2 is a sectional plan view. Fig. 3 is a perspective view of the interlocking washer-plates in locked position. Fig. 4 is a view showing the said plates detached. Fig. 5 is a sectional elevation.

Referring to the drawings, A indicates the felly, and B the spoke, having a tenon B', which fits in the socket A' of the felly A. Between the felly and end of the spoke I arrange the washer-plates C and C', said plates being somewhat similarly constructed and shaped, essentially, in the form of a U, one of the plates having its ends provided with shoulders $C^2$, while each has its bow portion formed with the angular enlargement or boss $C^4$ and $C^5$, respectively, and it will be noted that one of the enlargements $C^4$ extends past the edge of the plate, so that when the shoulders $C^2$ rest against the plate the said shoulders will lie flush with the enlargement, as shown. In operation these washer-plates are forced between the end of spoke and felly from opposite directions, thereby embracing the tenon of the spoke, and when the said plates have been forced inwardly as far as they will go the shoulders $C^2$ will interlock around the ends of the opposing plates upon opposite sides of the angular bosses $C^4$ and $C^5$, thereby securely interlocking the plates and preventing any possible dislocation of the same. Of course it will be understood that the tenon will prevent the movement of the plates in one direction and the shoulders prevent the movement in the opposite direction.

If desired, plates of varying thickness may be employed, so that any ordinary amount of wear can be taken up.

Having thus fully described my invention, what I claim as new, and desire to secure by Letters Patent, is—

1. A spoke-tightener consisting of two interlocking washer-plates, each essentially U-shaped, one of said plates being provided with angular shoulders at its ends and a boss intermediate its ends, the other plate having an angular boss at its center, the ends being devoid of shoulders, substantially as described.

2. A spoke-tightening device comprising the interlocking washer-plates C and C', the plates C having a central angular boss $C^4$, the plates C' having the end shoulders $C^2$ and the central boss $C^5$, said shoulders and boss extending in the same direction for the purpose described.

VALCOURE J. LA BAUVE.

Witnesses:
J. C. MATTHEWS,
R. E. LEWIS.